United States Patent

[11] 3,549,107

| | | |
|---|---|---|
| [72] | Inventor | Charles R. Zimmer<br>Brooklyn Park, Minn. |
| [21] | Appl. No. | 715,889 |
| [22] | Filed | Mar. 25, 1968 |
| [45] | Patented | Dec. 22, 1970 |
| [73] | Assignee | Honeywell Inc.<br>Minneapolis, Minn.<br>a corporation of Delaware |

[54] CONTROL APPARATUS
14 Claims, 3 Drawing Figs.

[52] U.S. Cl. .................................................. 244/77
[51] Int. Cl. ................................................... B64c 13/18
[50] Field of Search .......................................... 244/77M

[56] References Cited
UNITED STATES PATENTS

| | | | |
|---|---|---|---|
| 3,379,951 | 4/1968 | Franchi et al. ............... | 244/77X |
| 3,395,615 | 8/1968 | Taylor ........................ | 244/77X |
| 3,401,904 | 9/1968 | Nelson ....................... | 244/77 |

*Primary Examiner*—Milton Buchler
*Assistant Examiner*—Jeffrey L. Forman
*Attorneys*—Roger W. Jensen, Charles J. Ungemach and Gordon Reed

ABSTRACT: A condition control apparatus has the condition monitored by a limiter system, which modifies the operation of the apparatus to prevent the condition exceeding a predetermined magnitude or boundary limit.

The limiter system comprises dual or redundant limiter channels for improving reliability of the limiter system.

While the limiter system is fail operational, e.g., one limiter channel can function to limit the condition or place a boundary on the condition even if the other limiter channel has failed, in the event of a failure of both limiter channels in the same time period, a limiter channel monitor is responsive to such double failures and conveys such fact to an attendant.

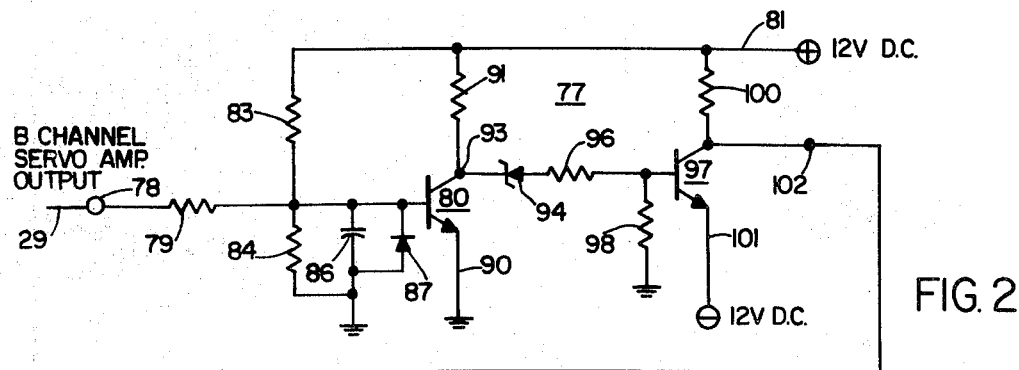
FIG. 2
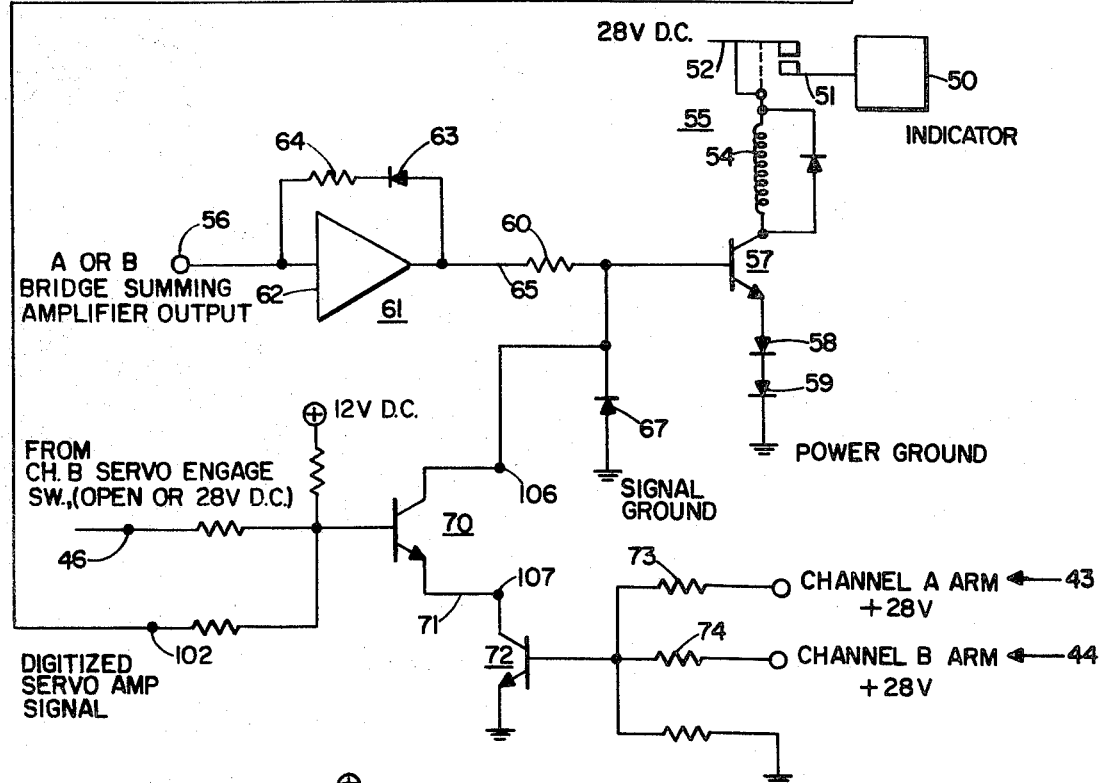
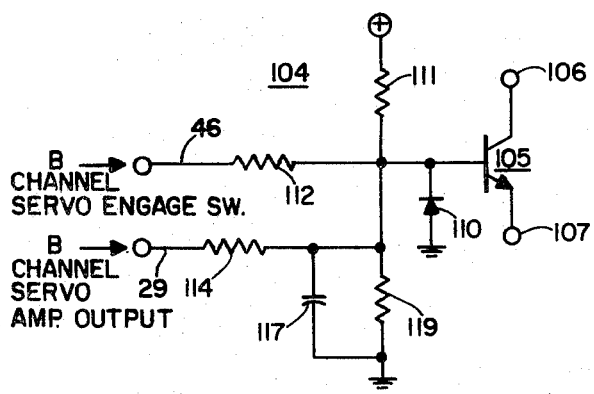
FIG. 3
INVENTOR.
CHARLES R. ZIMMER
BY *Handwritten signature*
ATTORNEY

CONTROL APPARATUS

BRIEF SUMMARY OF THE INVENTION

This invention is an improvement or in a sense an addendum to a concurrent filed application of Fred Smith, assigned to the same assignee as the subject application. The Smith application discloses control apparatus having a condition boundary limiter system consisting of dual or redundant limiter channels. Either limiter channel can exercise supervisory authority on the control apparatus to prevent operation of the apparatus resulting in the exceeding of a predetermined condition. The present invention incorporates the apparatus of the Fred L. Smith application but modifies it by providing a limiter channel servo engage monitor which, presupposing a failure in a first limiter channel, monitors the supervisory action of the condition by the second limiter channel and conveys information to an attendant if the second channel fails to apply a supervisory action when the magnitude of the condition being controlled requires such supervisory action.

An object of this invention is to provide a limiter system monitor as to the present capability of a limiter channel to apply corrective action to control apparatus to oppose a condition being controlled by the apparatus, thereby preventing the condition exceeding a predetermined magnitude.

A further object of this invention is to provide a limiter system monitor, said limiter system having redundant limiter channels, of the present capability of a limiter channel thereof to apply corrective action to control apparatus to oppose the condition being controlled by the apparatus, exceeding a predetermined magnitude.

A further object of this invention is to provide condition control apparatus with a limiter channel, operation readiness monitor, said monitor providing an indication that such limiter channel is not available to apply corrective action to oppose said condition exceeding a predetermined magnitude.

A further object of this invention is to provide a dual-channel limiter system for an aircraft control apparatus having provisions for manual control of the craft, along with limiter monitoring means for providing an indication that a limiter channel is not available to apply normal corrective action to oppose further change in the condition initiated manually when the condition attains a predetermined magnitude.

Further objects and advantages of the invention will be better understood from the following description considered in connection with the accompanying drawings disclosing an embodiment thereof by way of example.

In the drawings:

FIG. 2 is an electrical schematic of a limiter channel engage or preparedness monitor; and FIG. 3 is a modification of a portion of FIG. 2.

DESCRIPTION

Figure 1:
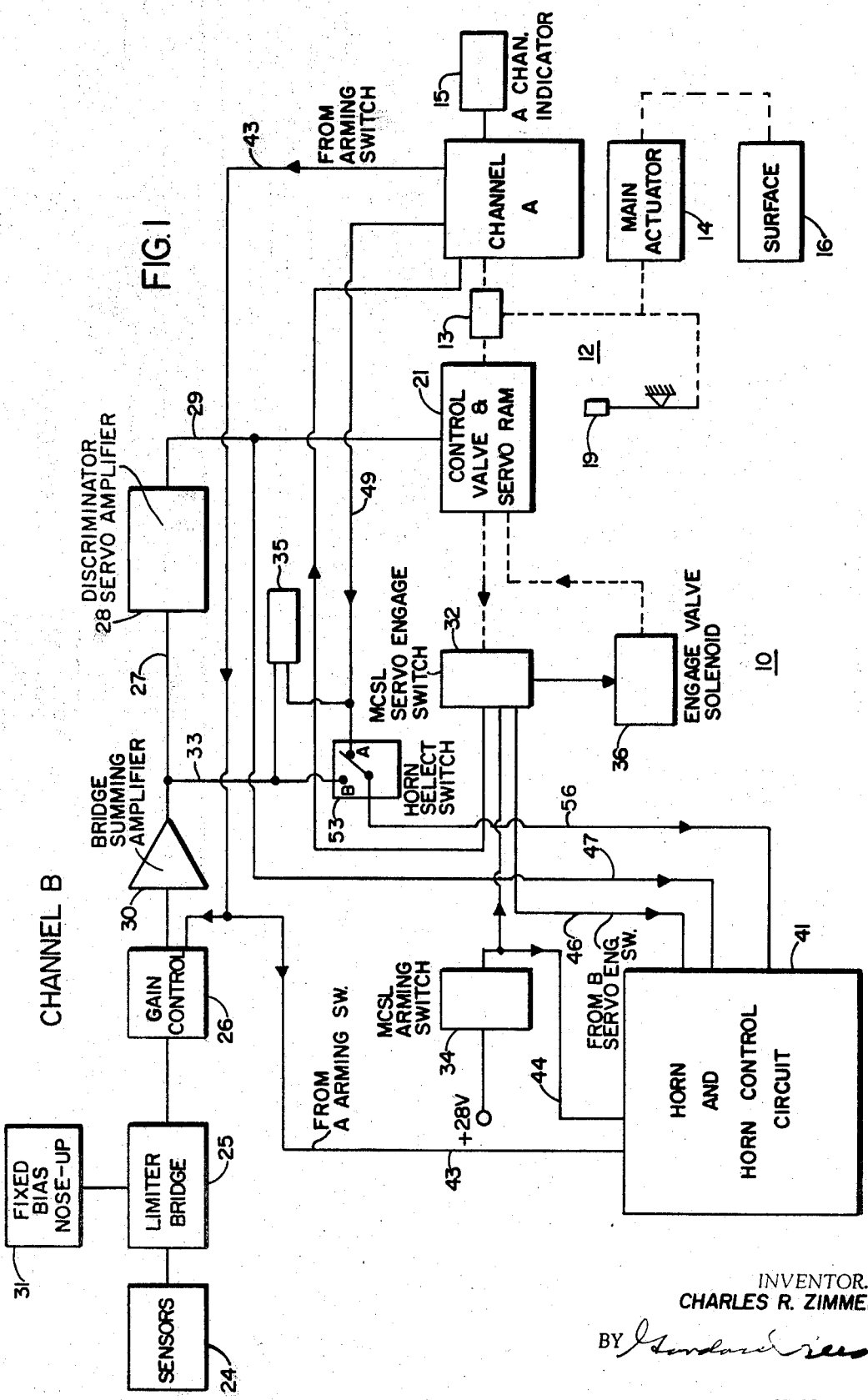
FIG. 1 is a block diagram of condition control apparatus including the novel redundant limiter monitoring arrangement.

Referring to FIG. 1 herein and also as disclosed in the Smith application Ser. No. 715,840, filed Mar. 25, 1968, a condition control apparatus 10 has redundant or dual-limiter channels, A shown in block form, and B in somewhat detail, which alternatively oppose a change in a condition, ordered by a manual controller, for example, beyond a predetermined magnitude. Channel A includes details also shown in channel B. Control channel A when operatively conditioned, includes a servomotor that operates through a suitable differential 13, linkage 12 to control a main actuator 14 that positions a control surface 16 or a condition control member. This automatic limiting control from limiter channel A conventionally opposes an increase in a condition beyond a predetermined magnitude. Such increase could be initiated by operation of a manual controller 19, having a conventional feel arrangement, for example, which through linkage 12 also controls the main actuator 14 and thus the condition control member 16.

Similarly, the limiter channel B, shown in somewhat detail, when channel A is unavailable or malfunctioning, also has its servomotor operate through the differential 13, linkage 12 to control the main actuator 14 and the condition control member 16 while the A channel servomotor is inoperative. Thus, the control apparatus 10 includes dual redundant limiter channels and is thus similar to the arrangement disclosed in the concurrently filed application of Fred L. Smith Ser. No. 715,840. The distinction over the invention in the Fred L. Smith application and the invention herein is in the provision of a Limiter Servo Engage Monitor. This monitor includes means to alert an attendant for the control apparatus upon failure both of the A channel and the B channel to exert a boundary limiter function on a condition being varied by the operation of the control member 16. As disclosed in the Smith application above, the A channel is the primary channel for normally effecting a limiter action on the control apparatus 10, and the B channel is merely a backup channel for emergency as that of a malfunctioning of the A channel. Consequently since failure of channel B causes loss of limiting entirely, the subject limiter servo engage monitor primarily relates to the situation where there is a malfunctioning in both the A and B channels. Thus the monitor of this invention is primarily associated with the B channel, since failure of both channels is involved and B's failure follows that of channel A.

In FIG. 1, the A channel is to be understood and as more fully disclosed in the Fred L. Smith application, includes a normally inoperative autopilot or limiter servomotor. This servomotor corresponding to servomotor 25 of Smith may be of the fluid-operated type and when inoperable, the operation of the manual controller 19 may be readily performed to effect control of the main actuator 14. In a similar manner, the B channel includes a fluid-type servomotor 21 corresponding with servomotor 25 of Pesola U.S. Pat. No. 3,081,968 typically having a transfer valve, an engage valve and a servopiston, with such servomotor likewise being normally inoperative and so arranged as to permit manual operation of the control stick 19 and control of main actuator 14. Control signals, in a simplified showing herein, are supplied to the servomotor 21 of the B channel from a limiter signal source comprising aggregate aircraft flight condition sensors 24 that supply various sensed control signals to a fixed biased noseup limiter bridge 25 having its output supplied through a gain control 26 to a bridge summing amplifier 30. The summing amplifier in turn supplies its output to a discriminator servoamplifier 28 having its output transmitted by conductor means 29 to the operating windings of the transfer valve in servo 21. Thus when the output of amplifier 30 is zero or opposite to the bias voltage from source 31 the condition has reached its limit, as more fully disclosed in the Smith application or in the U.S. Pat. to Pesola No. 3,081,968, in the latter one with switch 40, FIG. 1 therein, in the upper position as shown.

Under normal conditions while under manual control of stick 19, herein below the limit, a fixed bias voltage source 31 normally biases the limiter bridge 25 and its output through summing amplifier 30. Amplifier 28 serves initially to position the fluid control transfer valve of servomotor 21 to one extreme position which may be considered the maximum aircraft commanded the limit. At this time also, normally, an engage valve of the servomotor is biased to such position as to render the fluid servomotor ram or piston inoperative by its transfer valve. As the aircraft changes from its previous condition through operation of the control surface 16 by the manual controller 19, the flight condition increases, and such increase in the condition affects the sensor group 24 by the summation of its signals. Sensor group 24 collectively defines a varying limit function. Upon the attainment of a maximum limit function, the fixed bias from source 31 is overcome or neutralized by the output voltage of the sensors 24, and the output of the discriminator amplifier 28 on conductor 29 is such that the transfer valve moves to center position.

Such center movement of the transfer valve causes it to close an engage switch 32. With the previous manual closing of a solenoid-held arming switch 34, 28 volts DC is supplied through the arming switch or manual control signal limiter selection switch 34, to the now closed engage switch 32 to energize an engage solenoid 36. Solenoid 36 operates the engage valve in the servomotor 21 to open passages between the transfer valve and servo ram. Thus the servomotor 21 is available for operation of the main actuator and thus the control surface or control member 16. In the above arrangement, the operation of the servomotor 21 is mechanically in parallel with the manual control stick 19 so that movement of the servo operates or applies a force to the control stick 19, and the pilot is aware that the flight condition has attained a limit magnitude upon operation of servomotor 21.

If there be any further action tending to cause an additional increase in the condition which is sensed by the aggregate sensors 24, the control member or surface 16 will be so positioned by the servomotor 21 as to reduce the condition to within the predetermined limit function magnitude.

By referring to the Pesola U.S. Pat. No. 3,081,968 for details, or to the Smith application and equally applicable herein it will be apparent that the amplifier output conductor 29 herein leading to the servomotor transfer valve may have a different voltage thereon than initially which may be, of zero magnitude or of opposite phase than that provided by the bias voltage signal. This different voltage may exist because the bias signal and limiter signal cancel each other, or the bias signal is the lesser. Any opposite phase voltage that exists on conductor 29 calls for a reduction in the attained magnitude of the condition such reduction being obtained as by moving control member 16 downwardly. Thus with the arming switch 34 herein already in closed position, and an opposite phase signal the switch 32 should automatically close as by its contactor should engage its contact to close a circuit thereby energizing the engage valve solenoid 36 which results in operating the engage valve to permit porting of fluid or passage of pressure fluid through the transfer valve and coacting ports to the servopiston or ram.

In the present arrangement, as stated, the A limiter channel would normally be selected to operate before the B limiter channel when the limit is attained. However, in the event of a malfunction or failure, evidenced by an indication in the A channel, to operate at or slightly above the limit value to reduce the condition, the B channel should function. Continuing, in the event that the B channel is thereby selected to monitor the approach of the craft to the limit function but the servo engage switch 32 in the B channel has not been closed when the limit condition has been reached as would be expected, at which time the voltage on conductor 29 is zero or of opposite phase from that derived solely from the bias signal source 31, and with the pilot operating arming switch 34 previously closed, the novel servooperation preparedness or engage monitor becomes effective. The engage monitor is effective to advise the pilot of the craft or attendant of the control apparatus, through suitable audible or visual indicating means, of the failure also in channel B. The pilot, as thus advised, may then use controller 19 to fly the craft so that the condition is below the limit value.

The Limiter Engage Servomotor Monitor is provided herein in the form of an indicator such as an audible indicator 41, for example. Indicator 41 comprises for example a horn and a horn control circuit more fully described in connection with FIG. 2. There are five inputs to indicator 41 for determining its operation. One input to the circuit of indicator 41 is supplied over conductor 43 (from the A channel closed MCSL arming switch), that also controls the B channel gain device 26.

A second input is supplied from a 28 volt DC source, through closed arming switch 34 of channel B and conductor 44. A third input to indicator 41 is supplied through the closed MCSL servo engage switch 32 of channel B and conductor 46. A fourth input is supplied from amplifier output conductor 29 and conductor 47 to horn control circuit 41. A fifth input is supplied from an output conductor 49 of a bridge summing amplifier in channel A or conductors 27, 32 from the channel B summing amplifier to circuit 41 by means of a manually operable channel selector horn switch 53 and conductor 56.

As will be more fully understood from a description of FIG. 2, the 28 volt DC inputs on conductors 43, 44 are supplied by the closed arming switches of channels A and B which switches are similar to the switch 69 in Pesola. Thus, the energization of conductors 43, 44 indicates that the arming switches in both channels have been closed.

It is further evident on reflection that if the conductor 49 from channel A which extends from a bridge summing amplifier output means therein, such conductor corresponding to summing amplifier output conductor means 27, 33 of channel B, is at null this indicates that the A channel limit value has been attained. Further if conductor means 27, 33 of channel B, is at null this indicates that a limit value has been attained in channel B and since the channel B arming switch 34 has been closed, manually and switch 32 closed automatically, the engage valve solenoid 36 of channel B ought to have been operated or energized to move the servo engage valve to open or fluid passing position, e.g., unblock the passages between the transfer valve and servo ram. If a malfunction in channel B as well as in A, however, occurs, and if following a failure in channel A the pilot moves selector 53 to B, the arrangement 41 as will be described in connection with FIG. 2 will provide an audible signal or indication.

Referring to FIG. 2 an indicator such as an audible horn 50 is energized by a relay 55 by means of the engagement with its fixed contact 51 of a movable contact 52 connected to a voltage source of 28v, upon energization of an operating winding 54 of relay 55 termed the horn engage relay. Thus, when the relay 55 is energized, the horn 50 will sound or give an audible signal to the pilot of the aircraft. One end of winding 54 is connected to contact 52, engageable with contact 51. Contact 52 is connected to a suitable source of DC power such as a 28v. battery. The opposite end of winding 54 is connected to a collector of a transistor 57 having its emitter connected to ground through series diodes 58, 59 which diodes assure that the transistor 57 may be cut off. The base of transistor 57 is connected through a resistor 60 and amplifier arrangement 61 to a source of control signal which may be from the A channel limiter bridge, summing amplifier since the A channel includes details shown in channel B, or the B channel limiter bridge, whichever is selected by the attendant, through selector 53, FIG. 1.

The amplifier arrangement 61 comprises a high-gain noninverting amplifier 62 and a feedback path comprising a diode 63 and resistor 64. The arrangement is such that when the net signal to amplifier 62 is negative then the output on conductor 65 from amplifier 62 is negative and there will be no feedback through diode 63. Consequently the amplifier is at high gain, thus "shutting off" transistor 57 from conduction. However, when the net input to amplifier 62 is positive there is a positive output on conductor 65 thus biasing or turning on the transistor 57. The A channel limiter bridge summing amplifier similar to B channel limiter bridge summing amplifier 30 will provide a positive moving signal or a decreasing negative signal in response to the sensors providing an output thereto, and this positive going voltage increases in magnitude with an increase toward the limit condition. When the limit function is exceeded, the output of amplifier 30 is positive.

The base of transistor 57 is connected to signal ground through a diode 67 to prevent the base of the transistor going negative, and overstressing the base to emitter junction. Also connected to the base of transistor 57 for control thereof is a second transistor 70 having its collector connected to the base of transistor 57 and its emitter connected through conductor 71 to a collector of a third transistor 72. The emitter of transistor 72 is connected to signal ground.

The base of transistor 70 is supplied with three input voltages. Transistor 70 requires all three acting jointly to be conductive. One is a 12 + volt DC input, a second input is supplied from the B channel servo engage switch 32 upon closing thereof from a 28+ volt source, and a third input is supplied from a digitized servo amplifier signal of about +12 volts.

The base of a third transistor 72 is supplied with two signals. Either may render transistor 72 conductive. The two signals each are of 28 volts DC and are derived from the closing of the A channel arming switch and from the B channel arming switch 34. With transistors 70, 72 conducting, transistor 57 is cut off, and the circuit through relay winding 54 opened.

The third input to the base of transistor 70 as stated is a digitized servoamplifier signal. The effective limiter output on conductor 29 of the B channel from the servoamplifier 28 is an analogue signal. Thus the transfer valve of the servomotor 21, FIG. 1 should be in its zero or midposition when there is zero voltage on conductor 29. In as much as it is difficult, with respect to analogue signals, to ascertain accurately when they change from a plus value to a zero value and then to a negative value, such signal has been digitized herein to more readily identify when the zero voltage is reached on amplifier output conductor 29.

In FIG. 2, a digital arrangement 77 connected to the base of transistor 70 is of the electronic type. The circuit is to digitize the servoamplifier 28 output and to provide a time delay, as will be explained.

Circuit 77 comprises an input terminal 78 connected to conductor 29 to receive the output of discriminator servoamplifier 28. Extending from terminal 78 is a resistor 79 connected to a base of an NPN transistor 80. A +12 volt DC source is connected through conductor 81, resistor 83, to the base side of resistor 79. Also connected to the base side of resistor 79 is a resistor 84 extending to signal ground. A time-delay capacitor 86 is shunted about resistor 84. Capacitor 86 is shunted by a diode 87 having its cathode connected to the base and its anode connected to signal ground. The transistor emitter is connected to signal ground through a conductor 90, and the collector is connected to the 12+ volt DC source through conductor 81 and a resistor 91, with the output of the transistor 80 appearing at terminal 93 which is the collector side of resistor 91.

Extending from terminal 93 to the base of an NPN transistor 97 is a reverse biased Zener diode 94 and a resistor 96 in electrical series. Extending from the base side of resistor 96 to ground is a resistor 98. The transistor collector is connected to the +12 volt source through conductor 81 and resistor 100, and the emitter is connected to a −12 volt DC source through conductor 101. The output of transistor 97 is at the collector end of resistor 100 and appears thus at terminal 102 which is connected as an input to the transistor 70.

As to the operation of circuit 77, the output of terminal 102 is normally positive when the output of discriminator servoamplifier 28 and thus the signal input to terminal 78 is positive indicating that the limit function has not been exceeded. The output at terminal 102 is negative when the output of the discriminator servoamplifier 28 is zero or negative indicating that the limit function has been exceeded.

The sequence of operation, on failure, of the servo engage monitor, when there is provided a dual redundant MCSL (Manual Control Signal Limiter) system and a horn warning, assumes there is an A channel failure, then a B channel failure, then operation of the horn to sound a warning that both the A and B limiter channels have failed in operation. Thus upon a double failure of the operation of the channel A servo and the channel B servo, such as servo 21, FIG. 1, wherein such failure occurs when the B boundary is exceeded as determined by sensors 24 and the B servo fails to engage as by servo engage switch 32 remaining open and solenoid 36 unenergized, whereby oil cannot be ported to its ram, the servo engage monitor will provide horn warning.

During normal system operation, the A and B channel bridge summing amplifier output signals on conductor 27, 33 and conductor 49 will track and can be observed on a zero reader 35, FIG. 1 which meter is old in the art. If there is an A channel electronics failure, the A bridge summing amplifier signal will be different from the B channel signal and the comparison monitor or zero reader 35 will detect the error by displacement of its indicator from zero. The attendant may then select the B bridge summing amplifier output 27, 33 to provide a signal to the horn control circuitry 41. Also indicator 15 is electrically energized when the A channel arming switch solenoid holding means, as in the Smith application, has its circuit opened on closing of the B channel servo engage switch 32. The attendant thereby knows that there has been an A channel failure and moves selector 53 to the B channel position. If the summing amplifier outputs track as indicated by the zero reader 35, the attendant may have failed to initially close the A channel arming switch, causing indicator 15 to be energized. The A channel arming switch light 15 which is energized on closing of the B channel engage switch 32 provides the attendant a visual indication for selection of the B bridge summing amplifier if an A channel failure has thus occurred.

POSSIBLE CONDITIONS

Normal—Below Boundary, for either A or B channels:
    Servo amp output is at a positive voltage;
    Servo engage switch is open.
Normal—Above Boundary:
    Servo amp output is zero or negative;
    Servo engage switch is closed ($+28\ V_{dc}$).
Failure—Above Boundary:
    Servo amp output is zero or negative,;
    Servo engage switch is open.
Define Logic: For Double Failure, assuming existing A channel failure:
    B servo amp output (Positive Voltage) = A;
    B servo engage switch closed (+28 VDC) = B;
    Horn Signal = C.
Then we want for failure:
    $\overline{A}\ \overline{B} = C$.

Returning to circuit 77, the purpose of the time delay provided by capacitor 86 in circuit 77 will now be explained. We have seen from the above that if the output of discriminator servoamplifier 28 is zero or negative and the servo engage switches, such as engage switch 32, FIG. 1, are open that a failure is present. In as much as it may require a slight period of time after the output of discriminator amplifier 28 goes to zero before an engage switch such as switch 32 is operated under normal conditions, in order to avoid a false failure indication, the capacitor 86 discharges through the diode 87 and thus holds the base of transistor 80 positive for a short period of time even after the input on conductor 29 from the discriminator servoamplifier 28 has gone to zero or negative. Thus, at the end of this discharge period for the capacitor 86 under normal operations when the servoamplifier output has gone to zero, the engage switch 32 will have closed. However, if there is an actual malfunction related to the servovalve and the engage switch is not closed after the above period, a malfunction has occurred.

The Zener diode 94 compensates for level shift occasioned by the fact that transistor 80 is connected between +12 volt DC and signal ground and transistor 97 is connected between +12 volts and −12 volts DC.

FIG. 3 shows a circuit 104 that may be substituted for the portion of FIG. 2 between terminals 106 and 107. The circuit of FIG. 3 does not digitize the analogue servoamplifier signal as was done in circuit 77 of FIG. 2. The arrangement 104, FIG. 3 includes an NPN transistor 108 having its emitter connected to terminal 107 and its collector connected to terminal 106. The transistor base is connected to signal ground through a diode 110, having its cathode connected to the base. Three sources of voltage are applied to the base of the transistor 108, one through a resistor 111 from a +12 volt DC source, a second through a resistor 112 from the channel servo engage switch as 46, FIG. 1, and a third through a resistor 114 from the B channel servoamplifier output conductor 29. The base end of resistor 114 is connected to signal ground through a parallel arrangement of capacitor 117 and resistor 119 which provides the time delay as do capacitor 86 and resistor 84 in FIG. 77.

It will now be apparent that there has been provided a novel signal device for providing audible warning to the pilot or attendant of a control apparatus for controlling a condition. If the condition has attained a maximum desired magnitude, or boundary, either a primary or a secondary redundant limiter channel, normally would function to take corrective action to oppose a tendency of the condition to exceed the desired magnitude, with the secondary channel being effective for this function upon failure of the primary channel to take the corrective action. If the two primary and secondary channels are not available to take such corrective action, the audible warning is notice to the pilot or attendant that he must take corrective action manually.

OPERATION

After the aircraft is airborne and with the fixed bias applied from source 31 to limiter bridge 25 in the B channel and the similar bias applied to the limiter bridge A channel, both arming switches such as 34 in B channel are closed. The arming switches are held by conventional solenoid means in operated position. The pilot of the craft through the manually operable control stick 19 may then maneuver the craft which is detected by sensors 24. In channel A, when the collective voltage output from a sensor such as collective sensors 24 of channel B exceeds the fixed bias from source 31 on limiter bridge 25 therein, and with the channel select switch 53 engaged with the A contact and should the limit function exceed the bias on the limiter bridge, the A channel servo engage switch will be closed thereby completing a circuit to energize the engage valve solenoid which moves the engage valve to its open or fluid passage unblocking position. Consequently, when the limit function has been exceeded, the servoram will be operated to control the main actuator 14 and position the surface 16 to maneuver the craft so that the output from collective sensors 24 is below the limit function magnitude.

In the event that the A channel does not function to limit the condition when it attains its limiting value, and when the channel B servo engage switch 32 is closed it releases the holding solenoid for the channel A arming switch which then moves to its unoperated position. The pilot may also observe on zero reader 35 whether the channel A and channel B are tracking, and if they are not tracking he may then move the selector switch 53 to the B contact also noting that the channel A arming switch now is in the unoperated position indicating malfunction in channel A. Channel B may thereby perform the limiting action.

In the event that there is also a malfunction in channel B and with the voltages as shown in FIG. 2 applied to the horn and horn control circuit 41 resulting in its energization an audible indication will be given to the pilot advising him of the double failure in the limiting arrangement so that he can then operate the manually operable controller 19 to maneuver the craft below the limit previously selected.

I claim:

1. In condition control apparatus having an operable means for changing the condition, and redundant limiter channels each controlling operation of reversible motor means for automatically operating a further member for opposing a change in the condition, caused by previous operation of the operable means, in excess of a predetermined magnitude, in combination therewith: a limiter channel motor means engage monitor for detecting unavailability of a limiter channel to apply corrective action by the motor means automatically operating the further member, comprising:

means jointly responsive to the control governing the direction of operation of the motor means, and the operative engage condition of the motor means and further member; and output means controlled by said last-named means.

2. The apparatus of claim 1, and additional means jointly responsive to operation of an arming or operation preselection member for each of the redundant channels together with the last-named means controlling the output means.

3. The apparatus of claim 2, and means for altering the magnitude of the condition at which one channel normally becomes effective upon operation of both arming or operation preselection members.

4. The apparatus of claim 1, wherein the output means provides a warning signal to indicate unavailability of the limiter channel.

5. The apparatus of claim 1, wherein the motor means is of the fluid-operated type with its control or transfer valve biased for no servooperation and the motor means is conditioned for operation by a limiter channel upon attainment of a predetermined change in the condition to cause release of the bias on the control valve and enabling porting of fluid through the control valve to the power piston.

6. The apparatus of claim 5, wherein the means for conditioning the motor for operation includes a displaceable engage valve and actuating means therefor and wherein the actuating means is effective upon operations of said arming member and upon removal of the bias from the transfer valve.

7. The apparatus of claim 1 wherein the output means comprises an electronic circuit biased to conduction cutoff for small signals of one polarity in a redundant limiter channel, but of increasing conduction for control signals of opposite polarity therefrom.

8. The apparatus of claim 7, wherein the electronic circuit output depends not only on the signals from one limiter channel but also on the effects of similar signals from the other limiter channel.

9. The apparatus of claim 1, wherein each motor means includes an amplifier controlled by a condition sensing limiter with the motor means being effective or engaged for operation with the further means when the amplifier has a predetermined output, and wherein the motor means engage monitor is responsive to the output of the amplifier and to the engagement of the motor means and further means.

10. The apparatus of claim 9, and time-delay means in the motor means engage monitor prevents response from the monitor when the amplifier has reached the predetermined output, until the motor means and further means have had normal time to engage.

11. The apparatus of claim 6, and a servo engage monitor for monitoring the present effectiveness of each servo means comprising an AND device controlled by the selecting means in each redundant channel; a second AND device operated jointly by the means controlled by either channel, and the means controlled by both AND devices operating an indicator means.

12. The apparatus of claim 2, arming OR means in the upper channel selecting for operation of said member by said channel; and means for rendering ineffective the selecting means in the one channel when the other channel becomes effective to control said member.

13. The apparatus of claim 2, wherein each monitoring channel includes a limiter signal receiving device, and means responsive to the operation of a selecting or arming means modifying the output of the signal receiving device.

14. The apparatus of claim 13 wherein the means for changing the output of the signal-receiving device effects a fading action thereon.